Nov. 14, 1967
R. G. DUBE
3,353,121
DELAY LINE
Filed Aug. 15, 1963
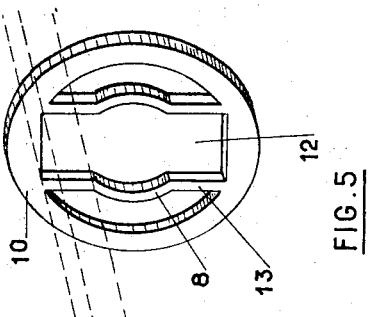
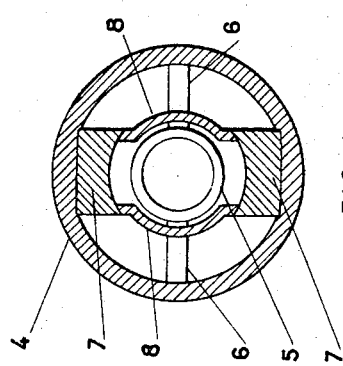
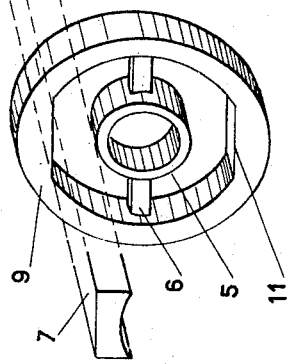
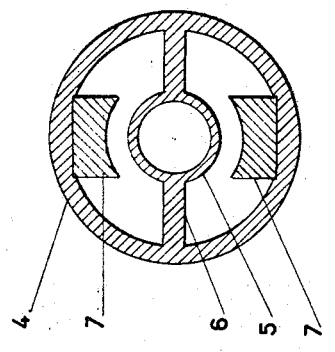
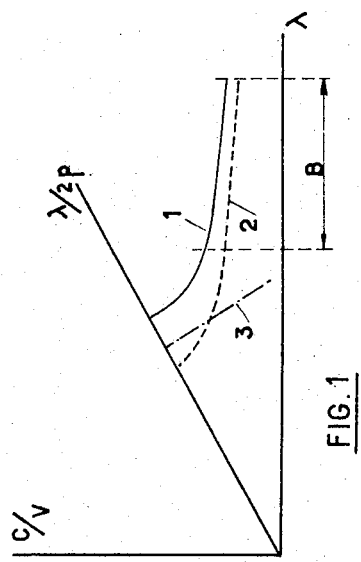
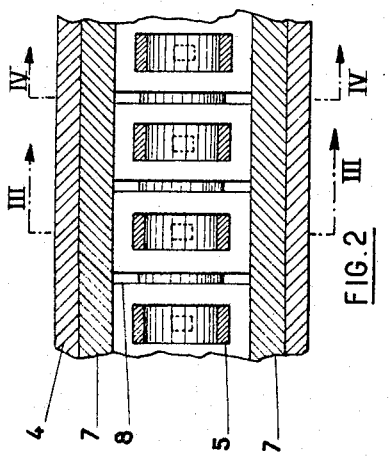
INVENTOR:
ROLAND G. DUBÉ
BY Paul M. Craig, Jr.
ATTORNEY

United States Patent Office 3,353,121
Patented Nov. 14, 1967

3,353,121
DELAY LINE
Roland G. Dubé, Paris, France, assignor to CSF—Compagnie Generale de Telegraphie Sans Fil, Paris, France
Filed Aug. 15, 1963, Ser. No. 302,369
Claims priority, application France, Sept. 4, 1962, 908,516
5 Claims. (Cl. 333—31)

The present invention relates to forward travelling wave amplifiers of cylindrical structure, and more particularly, relates to an improvement in delay lines utilized in forward wave amplifier tubes such as described in U.S. Patent No. 2,942,143, issued to Bernard Epsztein on June 21, 1960, and assigned to the same assignee of the present application.

The delay line in accordance with the aforementioned patent comprises a metallic guide which preferably but not necessarily constitutes the external envelope of the tube, and which includes coaxial metallic ring-like annular members, each secured to the wall of the tube by $n$ radial metallic spokes or rod-like supports, as seen in cross-sectional views at right angle to the axis of the tube. This prior art delay line is characterized by the combination of features that the angular displacement between spokes or rod-like support members of successive ring-like or annular members is zero and that $n$ metallic filler members are disposed along the inner wall of the tube within the sectors delimited by radial spoke-like support members, which filler members extend over the entire length of the tube.

This prior art line is utilized for the interaction of the electron beam propagating on the inside of the ring-like or annular members with the fundamental space harmonic of the high frequency wave propagating within the line, of which the dispersion is normal or direct for this fundamental. More particularly, one utilizes for the interaction a symmetric mode of propagation of this fundamental, that is, a mode of which the distribution of high frequency potential along the ring or annular member is symmetric with respect to an axial plane of the line, and of which the field on the inside of the annular or ring-like members consequently is not zero. However, experience has shown that in addition to this symmetric mode, the line of the type in question is the seat of propagation of at least one anti-symmetric parasitic mode, that is, a mode having a distribution of high frequency potential along the ring without symmetry with respect to any axial plane, and of which the field is consequently zero in one of these axial planes. This anti-symmetric more propagates on wave lengths within the useful band corresponding to the utilization of the symmetric mode, and disturbs and impairs in an undesirable manner the operation and functioning of the tube. In effect, even though it is only slightly coupled to the beam, this anti-symmetric mode may absorb energy at certain frequencies or may cause parasitic oscillations.

The present invention has as an object the elimination of this inconvenience. The present invention may be realized in every line of the type in question comprising at least two filler members and consists in connecting these filler members by bridges or straps within the planes situated between the successive annular members. Experiments have proved that with such an arrangement the propagation of the anti-symmetric mode still subsists but that the band of this propagation is displaced and no longer falls substantially within the useful band of the symmetric mode.

Accordingly, it is an object of the present invention to provide a delay line of the type mentioned hereinabove which eliminates, by simple means, the shortcomings and drawbacks encountered with the known structures.

It is another object of the present invention to provide a wave-guiding structure—with delay characteristics— of the type mentioned hereinabove in which means are provided to effectively prevent impairment of the operation of a tube utilizing such wave guiding by the existence of anti-symmetric modes within the useful frequency band.

A further object of the present invention resides in the provision of a delay line structure of the type mentioned hereinabove in which the delay line is so constructed and arranged as to effectively displace the propagation of any anti-symmetric mode outside of the useful band for which the delay line is intended to operate with the symmetric mode.

These and other objects, features and advantages of the present invention will become more obvious from the following description when taken in connection with the accompanying drawing which shows, for purposes of illustration only, one embodiment in accordance with the present invention, and wherein:

FIGURE 1 is an explanatory diagram of the present invention;

FIGURE 2 is a partial longitudinal cross-sectional view of a delay line corresponding substantially to FIGURES 1 and 2 of the aforementioned U.S. Patent 2,942,143 and provided with straps according to the present invention;

FIGURE 3 is a transverse cross-sectional view through the line of FIGURE 2, taken along line III—III of FIGURE 2;

FIGURE 4 is a transverse cross-sectional view of the line in accordance with the present invention, taken along line IV—IV of FIGURE 2; and FIGURE 5 is an exploded view illustrating the various parts of a delay line in accordance with the present invention of which the stacking and assembly permits realization of a line according to FIGURES 2 to 4.

Referring now to the drawing wherein like reference numerals are used throughout the various views to designate like parts, and more particularly to FIGURE 1, this figure is a dispersion diagram for the delay lines of the type in question. FIGURE 1 represents the delay ratio $c/v$ (where $c$ is the velocity of light and $v$ is the phase velocity of the wave) as a function of the wave length $\lambda$. The dispersion curves of the fundamental space harmonic extend within the portion of the diagram comprised between the axis $\lambda$ and the straight line $$\frac{c}{v}=\frac{\lambda}{2p}$$

where $p$ is the pitch of the delay line. The curve 1 in full line represents the typical dispersion of the symmetric mode for the delay lines of the U.S. Patent 2,942,143. The curve 2 in dash line represents the typical dispersion of the anti-symmetric mode for the same lines. It may be seen that the curve 2 falls within the band B of useful wave lengths of the desired mode corresponding to the curve 1, and consequently the undesirable mode is susceptible to impair the proper operation of the tube.

FIGURES 2, 3 and 4 represent a delay line conforming in the essential parts thereof to FIGURES 1 and 2 of the U.S. Patent 2,942,143 and improved according to the present invention. The line comprises a cylindrical metallic guide 4 within which is disposed a series of rings or annular members 5, each supported for example, by two metallic diametrically opposite rods 6, fixed to the walls of the guide 4. Two metallic filler members 7, secured to the wall of the guide 4, extend longitudinally across the guide 4 and at right angle to the plane of the rods 6 within the space between the annular members 5 and the guide 4. The function, electrical operation and purpose of these filler members have been fully explained in the aforesaid U.S. Patent 2,942,143, and so a detailed description of these elements need not be repeated here as being outside of this scope of the present invention.

According to the present invention, the two filler members 7 are connected periodically by straps 8, visible in the longitudinal cross section of FIGURE 2 and in the transverse cross section of FIGURE 4, taken along line IV—IV of FIGURE 2. These straps 8 are disposed within the median between the planes of each pair of successive annular members 5.

FIGURE 5 represents a perspective exploded view of a possible realization of the assembly of FIGURES 2 to 4 by stacking alternatively pieces such as 9 and 10, the piece 9 being a ring supporting an annular member 5 by way of rods 6 thereof, and the piece 10 being a washer suitably cut in such a manner as to provide the straps 8. The filler members 7 are passed through the pieces 9 and 10 in such a manner that they come to abut against the flat surfaces 11 of the piece 9 and to be accommodated within the pockets or apertures 12 of the piece 10. The assembly is brazed thanks to which the series of pieces 9 and 10 are connected to form the guide 4 of FIGURE 1 whereas the filler members 7 are secured, on the one hand, to the body of these pieces and, on the other, to the lateral supports 13 of the straps 8.

Returning now to FIGURE 1, and considering a line improved in accordance with the present invention for which the dispersion curve of the symmetric mode coincides with the curve 1 in full lines, tests have shown that the dispersion curve of the anti-symmetric mode no longer occupies the position of the curve 2 but that of the curve 3 shown in dash and dot line which no longer falls within the useful band B. Thus, the impairment to the proper operation of the tube by the anti-symmetric mode is effectively eliminated by the present invention.

While I have shown and described one embodiment in accordance with the present invention, it is, of course, understood that the same is not limited thereto but is susceptible of numerous changes and modifications as known to a person skilled in the art. For example, instead of being applied to a line with two filler members, the present invention is also applicable in the same manner to lines with three, four or more filler members. In all of these cases, the existence of straps between the filler members constitutes the essence of the present invention which, however, is not modified by all the variations known to the imagination of a person skilled in the art.

Consequently, I do not wish to be limited to the details shown and described herein but intend to cover all such changes and modifications as are encompassed by the scope of the appended claims.

I claim:
1. A delay line comprising:
a series of separate metallic ring-like members mutually spaced from each other so as to form individual ring-like members,
a guide member having a metallic cylindrical surface essentially coaxially surrounding said rings,
means for imparting to said delay line a forward dispersion characteristic to provide a fundamental space harmonic travelling along said delay line which is forward, including at least two individual support means for each of said metallic ring-like members for individually supporting each of said members within said guide exclusive of the next adjacent member and a corresponding number of conductive segment-like members secured to the inside of said guide and extending intermediate said support means over the length of said line,
and strap means periodically interconnecting said segment-like members within planes intermediate the planes of said successive ring-like members thereby substantially eliminating in said delay line the overlap of wave length band of propagation of the symmetric and anti-symmetric modes of propagation of said fundamental space harmonic, respectively.

2. A delay line comprising:
a series of separate metallic ring-like members mutually spaced from each other,
a guide member having a metallic cylindrical surface essentially coaxially surrounding said rings,
means for imparting to said delay line a forward dispersion characteristic to provide a fundamental space harmonic travelling along said delay line, including at least two individual support means for each of said metallic ring-like members for individually supporting each of said members within said guide exclusive of the next adjacent member and a corresponding number of conductive segment-like members secured to the inside of said guide and extending intermediate said support means over the length of said line,
and strap means interconnecting said segment-like members within planes intermediate the planes of said successive ring-like members, said strap means being elongated metal elements having arcuate portions substantially coaxial with said ring-like members.

3. A delay line, comprising:
a plurality of individual conductive rings mutually spaced along a common axis,
a guide member having a conductive cylindrical surface substantially coaxially surrounding said rings,
at least two radial oppositely directed conductive rods supporting each of said rings on said surface, said supporting rods being symmetrically distributed along said rings and being aligned to form arrays in axial planes with supporting rods of adjacent rings, the number of said rods in each of said arrays being equal to the number of said rings,
a number of conductive filler members equal to the number of said rods supporting each of said rings, each of said filler members having a form of a cylindrical segment extending essentially axially over said rings in the space between the cylindrical surface of said guide member and the external surface of said rings and being secured to a portion of said cylindrical surface outside the fixation point of said rods on said cylindrical surface, and conductive strapping elements interconnecting said filler members in planes intermediate the planes of said successive rings,
two filler members being fixed to opposite portions of said surface and having a plane of symmetry substantially at right angles to said rods, and two of said strapping elements being provided in each plane intermediate the planes of said successive rings, said strapping elements interconnecting opposite points of respective filler members and passing respectively on both sides of said axis.

4. A delay line formed by an assembly of two series of alternate washers, the washers of the first series comprising an external ring and an internal ring substantially coaxial with each other and at least two radial metallic rods fixed between said external and internal rings, and the washers of the second series comprising an external ring and strapping elements interconnecting predetermined points of said external ring, said washers being assembled so that said external rings form a guide member having a metallic substantially cylindrical surface coaxially surrounding said internal rings, and so that said radial rods are aligned to form arrays in axial planes with radial rods of adjacent washers of said first series, and a number of metallic filler members equal to the number of said rods supporting each of said rings, each of said filler members extending substantially axially over said series of internal rings in the space between the cylindrical surface of said guide member and the external surface of said internal rings, and being secured to said cylindrical surface in contact with said strapping elements periodically distributed therealong.

5. A delay line, comprising:
a plurality of individual rings mutually spaced along a common axis,
a guide member having a surface substantially coaxially surrounding said rings,
at least two radial oppositely directed rods supporting each of said rings on said surface, said supporting rods being symmetrically distributed along said rings and being aligned to form arrays in axial planes with supporting rods of adjacent rings,
a number of filler members supporting each of said rings, each of said filler members extending over said rings in the space between the surface of said guide member and the external surface of said rings and being secured to a portion of said surface outside the fixation point of said rods on said surface, and strapping elements interconnecting said filler members in planes intermediate the planes of said successive rings,
two filler members being fixed to opposite portions of said surface and having a plane of symmetry substantially at right angles to said rods, and two of said strapping elements being provided in each plane intermediate the planes of said successive rings, said strapping elements interconnecting opposite points of respective filler members and passing respectively on both sides of said axis.

References Cited
UNITED STATES PATENTS

| | | | |
|---|---|---|---|
| 2,768,322 | 10/1956 | Fletcher | 315—3.5 |
| 2,930,927 | 3/1960 | Sensiper | 315—3.5 |
| 2,939,993 | 6/1960 | Zublin | 315—3.5 |
| 2,942,143 | 7/1960 | Epsztein | 333—31 |
| 2,957,102 | 10/1960 | Flannery | 315—3.5 |
| 3,011,085 | 11/1961 | Caldwell | 315—3.5 |

HERMAN KARL SAALBACH, *Primary Examiner.*

C. BARAFF, *Assistant Examiner.*